T. D. MILLEA.
RELIEF VALVE.
APPLICATION FILED DEC. 5, 1917.
1,282,613.
Patented Oct. 22, 1918.
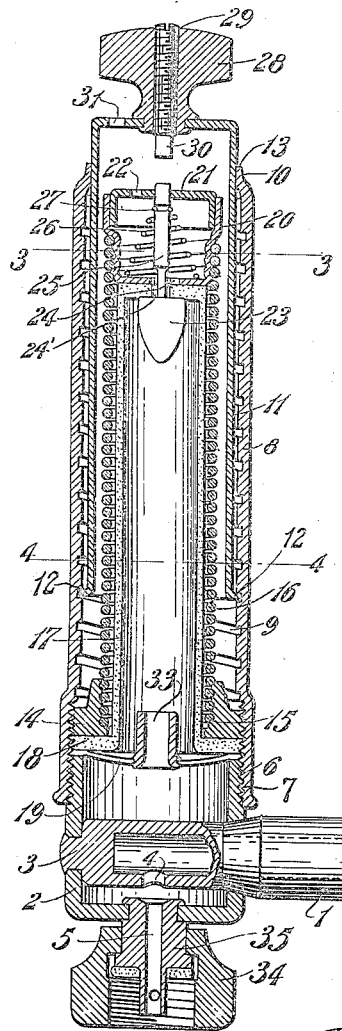
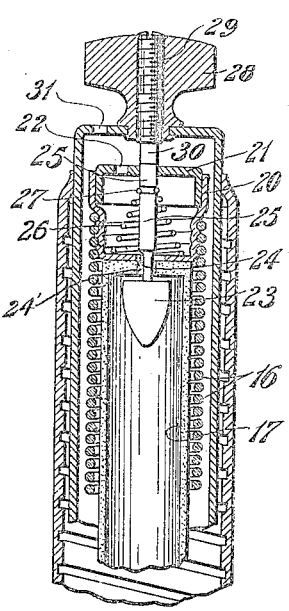
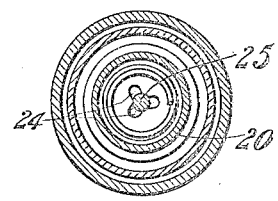
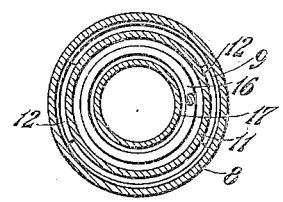
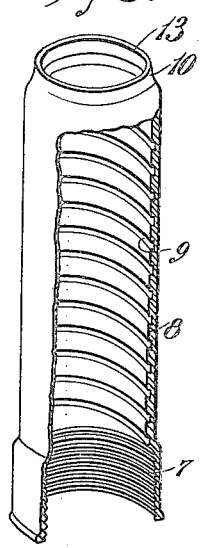
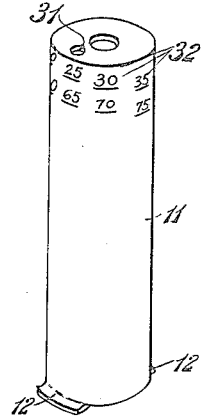
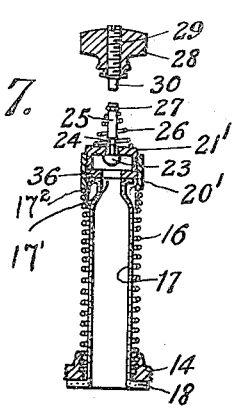
WITNESS:
B. A. Leaver
INVENTOR,
T. D. Millea,
BY
Harry W. Bourin.
ATTORNEY.

UNITED STATES PATENT OFFICE.

THOMAS D. MILLEA, OF SPRINGFIELD, MASSACHUSETTS, ASSIGNOR TO THE TRY-ME MANUFACTURING COMPANY.

RELIEF-VALVE.

1,282,613.

Specification of Letters Patent.

Patented Oct. 22, 1918.

Application filed December 5, 1917. Serial No. 205,506.

*To all whom it may concern:*

Be it known that I, THOMAS D. MILLEA, citizen of the United States of America, residing at Springfield, Hampden county, and Commonwealth of Massachusetts, have invented certain new and useful Improvements in Relief-Valves, of which the following is a specification.

This invention relates to improvements in relief valves. It is particularly designed for use in connection with the inflation of automobile tires. An object of the invention is to permit the tire to be inflated, and at the same time to quickly and accurately determine the pressure of the air that is to be forced into the tire by the pump. A further object of the invention is to permit any excess pressure to be automatically relieved during the operation of pumping up the tire. A further object is to provide means for relieving or allowing the escape of air should the pressure be greater than that required, and to automatically have the valve close at a predetermined pressure. It is a well known fact, that in pumping up tires by means of a pump that is attached to the motor of the machine, or to a supply tank of air, that there is danger of the tire being inflated to too high a pressure. The present invention is, therefore, designed to avoid the possibility of excessive pressure. A further object is to provide means for setting the valve at a predetermined pressure so that when this pressure is reached, it will automatically open and allow the air to escape to the atmosphere, thus preventing the tire from being over inflated.

Referring to the drawings:

Figure 1 is a vertical sectional view through the axis of the valve, showing the interior construction thereof, which comprises, in general, an outer casing having an interior thread, an inner cylindrical casing having a connection with this thread and designed to be rotated in the outer cylinder, and the valve device for automatically relieving the pressure.

Fig. 2 shows the position of the parts at the time the valve is automatically opened to relieve the excess pressure.

Fig. 3 is a horizontal sectional view on the line 3—3 of Fig. 1 taken through the valve stem and spring which normally holds the valve closed.

Fig. 4 is a horizontal sectional view on the line 4—4 of Fig. 1 showing the relation of the outer cylinder and the inner cylinder, the tension spring and the inner rubber tubing.

Fig. 5 is a detail view of the outer cylinder, a portion of the same being broken away to illustrate the interior threaded construction.

Fig. 6 is an elevational view of the inner cylinder showing the air pressure figures marked thereon and the struck up fins which form teeth for engaging threads of the outer cylinder.

Fig. 7 is a modification.

Referring to the drawings in detail:

1 indicates the stem to which the hose of the air pump is connected. This stem is secured to the base piece 2 by means of the headed or riveted connection 3, and is formed with an opening 4 to permit the air under pressure to pass downward through the passageway 5 into the tire. The upper end of the base piece 2 is threaded as indicated at 6 to receive the threads 7 at the lower end of the outer casing 8. This casing is formed with the internal threads 9. The upper end of the outer casing 8 is formed with a contracted portion 10. Located within the casing 8 is the cylindrical member 11, a detail in elevation being shown in Fig. 6. This member is formed with outwardly projecting ribs 12 which serve as teeth for engaging the threads 9 of the member 8. The sectional view in Fig. 1 clearly shows the assembled construction. It is clear that by rotating the member 11 in the outer casing 8 that the cylindrical member 11 can be raised and lowered relative to the upper end or edge 13 of the outer casing. 14 designates a threaded block which is screwed into the threaded part 7 of the outer casing 8. This block is formed with a seat 15 on which rests the lower end of the coiled spring 16. 17 is a tube composed of rubber that is located within the spring 16 and extends upward to nearly the upper end of the spring. The lower end of the rubber tube is formed with a thickened portion 18, which is located below the block 14. The thickened portion 18 is clamped between the threaded block 14 and the base piece 6 below which is located the perforated disk 19. Inserted in the end of the spring 16 is a thimble shaped member 20, which is formed with threads to receive the upper end of the spring, and located in the upper end of the member 20 is a cup shaped member 21 formed with an opening 22 to allow for the escape of the air from the interior of the tire, as will be fully described later.

23 designates a valve of any suitable material the lower end of which is made conical in shape or pointed. The valve 23 is inserted in the rubber tube 17 before the parts are assembled, by inserting the valve stem 25 through the opening 24 in the base portion of the rubber tube. Attached to the valve 23 is a stem 25, which passes through the opening 24 in the lower side of the thimble shaped member 20, and also through the opening 24' in the upper end of the rubber tube 17. It also passes through an opening in the upper end of the cup-shaped member 21. Located within the member 20 is a coiled spring 26, the upper end of which is attached to the stem 25 as indicated at 27. This spring rests on the lower end of the thimble shaped member 20 and normally acts to retain the valve 23 is a closed position. It will be noticed that the stem 25 normally projects upward above the upper surface of the cup shaped member 21. Secured in the upper end of the cylindrical shaped member 11 is a knob or handle piece 28 and located in this piece is a screw 29 which extends downward with its lower end 30 within the cylindrical member 11. The upper end of the cylindrical member 11 is formed with an opening 31 to permit the compressed air to escape from the interior of the rubber cylinder 17 when the valve 23 is open to the atmosphere. (See Fig. 2.) The opening 24, it should be observed, is formed with three radially extending branches clearly shown in the plan view in Fig. 3. The outer surface of the cylinder 11 is provided with numerals 32, which indicate the pressure of the compressed air within the rubber tube 17 and consequently the same pressure within the tire when the valve opens during the operation of inflation.

Referring now to the operation of my invention, it is to be understood that air under pressure is forced into the tire through the tubular connection 1, to which a suitable line of hose is attached. The valve 23, as stated, is in a closed position. The cylinder 11 is first rotated within the outer casing 8 in order to bring any one of the numbers 32 which indicates the pressure required, so as to register with the upper edge 13 of the outer casing. This part of my valve is known as the "Schrader gage". As the air is being pumped into the tire it will at the same time pass upward into the rubber tube 17 through the opening 33 in the disk 19. The purpose of the disk 19 is to prevent the portion 18 of the rubber tube 17 from being distorted or forced out of place when the nut 14 is turned down, as there is a possibility of the rubber buckling up or becoming uneven which would produce a joint that is not air-tight. The disk 19 would prevent this as it would slip on the upper edge of the base-piece 6. The purpose of the tubular member 33 is to maintain the lower end of the rubber tube 17 open at all times as there is a possibility of the tube collapsing at this point when the air pressure is withdrawn. The air within this rubber tube causes the spring 16 to stretch carrying with it the rubber tube 17. When the pressure within the tire reaches the predetermined pressure, say for example 70 pounds, the lower end 30 of the threaded screw 29 in the knob 28 engages the upper end of the stem 25 causing the valve 23 to move downward to an open position. It should be stated that the figures 32 on the barrel 11 have been previously placed thereon and which accurately indicate the pressure within the tire when the valve opens, these figures having been verified by means of a gage known to be standard. When the stem 30 engages the stem 25 the valve 23 is opened, the screw 29 is then permanently and fixedly secured in the knob 28 by soldering or other suitable means and after this has been permanently secured, it is not necessary to change its position for future readings. The air from the interior of the rubber tube 17 now escapes through the openings 24, 24', 22 and 31, to the atmosphere. With a continued action of the pump no more air will enter the tire being inflated, but will readily escape to the atmosphere when the parts are in the position shown in Fig. 2. Upon the stopping of the air pump, the valve 23 immediately closes at the predetermined pressure indicated on the cylinder 11 by any one of the numerals 32.

From this construction it will be seen that an accurate means is provided for quickly setting and automatically determining the pressure of the air in the tire at the end of the operation of inflation without the necessity of detaching the hose and applying a gage to the valve stem. It will also be seen that an accurate means is provided for quickly setting the relief valve to the pressure desired in the tire without the necessity of detaching the hose when the tire is being inflated. It is also clear that this device will automatically allow for the escape of air from the tire, should the pressure, for any reason, increase during the operation of the machine. The device is attached to the usual valve stem by means of the usual rotatable collar 34, which turns on the connecting piece 35.

It is to be understood that I do not limit myself to the specific use of fins, indicated at 12, on the inner cylinder 11, as I may, if desired, use a full thread, or threads, or any equivalent device for connecting the two cylinders together.

Referring to the modification shown in

Fig. 7, the rubber tube 17 instead of being formed with a closed upper end is made open as shown at 17'. Secured into the upper end of the spring 16 is a coupling or tubular member 20'. 21' designates a cap that is threaded into the member 20'. 23 designates a valve for closing the opening 24 in the cap 21'. The valve stem 25 passes through the opening 24 to the upper end of which the spring 26 is attached, as shown at 27, for normally holding the valve closed. 36 is a metallic washer for clamping the flange 17² to the coupling 20'. The pin 30, as above described, engages the upper end of the valve stem 25 to move the valve 23 open when the rubber tubing 17 is extended by the compressed air therein.

What I claim is:

1. In a relief valve for pneumatic tires, the combination, with an outer cylindrical member, an inner cylindrical member adjustably attached thereto, and having means to provide relative movement between said members, but retaining said inner member in its adjusted position, a coiled spring within the inner member and a rubber tube within the coiled spring and having an opening therethrough, a thimble shaped device secured to the upper end of the coiled spring for closing the same, a valve located below the opening, a spring for normally operating the valve for closing the opening in the rubber tube, a stem connected to said valve and extending through the opening in the rubber tube and upwardly to and within the thimble device of the inner cylinder member, an adjustable device carried by the inner cylindrical member for engaging the valve stem for opening the valve when the pressure within the rubber tube reaches a predetermined amount, as indicated on the inner cylinder, whereby further inflation of the tire or other body is prevented.

2. In a tire inflation relief valve, the combination, with an outer member, an inner member having a threaded connection therewith and for relative movement within the outer member, the upper end of the inner member having numerals thereon to indicate the air pressure, means arranged within the inner member for communication with the air within the tire to be inflated and comprising a rubber tube having an opening therethrough, said tube being located within an extensible spring, a thimble shaped member located within the upper end of the spring and engaging the upper end of the rubber tube, a cup shaped member for closing the open end of the thimble shaped member, an expansible spring located within the thimble shaped member, a valve stem passing through the cup shaped member and the end of the thimble shaped member, a valve secured to the valve stem and within the rubber tube for normally closing the opening in the rubber tube, a projection secured to the inner cylinder for engaging the valve stem as the spring is extended a definite distance corresponding with the pressure within the tube, means to permit the air to escape to the atmosphere as the valve is opened.

3. In a pressure regulating valve for pneumatic automobile tires, the combination, of an outer casing, an adjustable tubular member located therein and attached to the outer casing for designating a predetermined pressure, extensible means within the tubular member for confining the air in said tubular member, a valve located within the extensible member, means for opening the valve when the predetermined pressure is reached and additional means for automatically closing the valve when the excess pressure above the predetermined pressure is reduced to the predetermined pressure.

4. In a device of the class described, in combination, with outer and inner cylindrical members having inter-engaging and adjusting devices, the inner cylinder having numerals to indicate a predetermined pressure, an adjustable stem at the upper end of the inner cylindrical member, a valve within said inner member, a stem secured thereto for engaging the stem of the inner cylindrical member for opening the valve when a predetermined pressure shown on the inner cylindrical member is reached.

5. In a pressure regulating device, the combination, with outer and inner cylinders, a threaded connection therebetween to permit of adjustment of one cylinder relative to the other for the purpose of adjusting the device to a predetermined pressure, an extensible coiled spring and an elastic member located within the coiled spring, the elastic member having its lower end secured to the outer casing, its upper end being formed with an opening, a valve for closing the opening, a stem on the valve projecting upward through the opening in the elastic member, but of less diameter than the opening, a chambered casing secured to the extensible coiled spring for providing a bearing for the valve stem, a spring located within the chamber of the casing and secured to the valve stem for normally holding the valve in a closed position, the inner cylinder having an adjustable device for engaging the valve stem for causing the valve to open when the predetermined pressure of air is introduced into the elastic chamber, said spring within the casing serving to close the valve when the air pressure is shut off, as described.

6. In a pressure regulating device, comprising in combination, an outer casing, an inner casing connected to the outer casing and having relative movement with the outer casing, its upper end having figures on its circumference to register with the upper edge of the outer casing, means located within the inner casing for receiving air under pressure and comprising an elastic member located within an extensible spring, a casing secured to the upper end of the spring and formed with an opening in its upper and lower ends, a valve located within the elastic casing, means carried by the inner casing for engaging the stem of the valve for opening the same at a predetermined pressure, and means in the casing at the end of the spring for closing or returning the valve when the supply of air is shut off, as described.

7. An air pressure relief valve for pneumatic tires and the like comprising, in combination, outer and inner casings having a threaded connection with each other for determining the pressure at which said valve will open, means for connecting the same to the valve stem of a tire, an extensible member in communication with the interior of the tire being inflated and having an opening therethrough, a valve for closing the opening, means for unseating the valve when the pressure in the extensible member assumes a definite predetermined pressure and means for retaining the valve normally closed, said inner casing having markings thereon to indicate the predetermined pressure.

8. An air pressure relief valve construction, comprising, in combination, outer and inner members, devices for adjusting one member relative to the other and for retaining the same in such adjusted position, an extensible member within the inner member and open at both ends, a valve for normally retaining one end of the extensible member closed, a stem on the valve, an abutment on the inner-member engaging the stem for opening the valve and means for closing the valve when a predetermined pressure is introduced into the extensible member, said means including a spring secured to the valve stem for returning the valve to its closed position when the extensible member returns to the normal position.

9. A pressure relief valve construction comprising, in combination, two members, means for adjusting one member relative to the other and for retaining the same in such adjustment, the adjustable member having numerals thereon to indicate desired pressures at which the relief valve will operate, an extensible member within the adjustable member, and having its ends open, a hollow casing secured to the extensible member and serving to close one of its ends, a fixed stop on the adjustable member, a valve carried by the casing on the extensible member and operated by the stop on one of the adjustable members when the pressure in the extensible member corresponds to the pressure indicated by a numeral on the adjustable member, as described.

THOMAS D. MILLEA.